US011682927B2

(12) United States Patent
Lin et al.

(10) Patent No.: US 11,682,927 B2
(45) Date of Patent: Jun. 20, 2023

(54) WIRELESS POWER TRANSFER TO BIOMEDICAL IMPLANTS

(71) Applicant: University of Florida Research Foundation, Inc., Gainesville, FL (US)

(72) Inventors: Jenshan Lin, Gainesville, FL (US); Lawrence Fomundam, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 17/875,552

(22) Filed: Jul. 28, 2022

(65) Prior Publication Data

US 2023/0022747 A1   Jan. 26, 2023

Related U.S. Application Data

(63) Continuation of application No. 16/644,863, filed as application No. PCT/US2018/049526 on Sep. 5, 2018, now Pat. No. 11,451,093.
(Continued)

(51) Int. Cl.
*H02J 50/12* (2016.01)
*H02J 50/20* (2016.01)
(Continued)

(52) U.S. Cl.
CPC .............. *H02J 50/12* (2016.02); *H01F 38/14* (2013.01); *H02J 50/20* (2016.02); *H02J 50/402* (2020.01)

(58) Field of Classification Search
CPC .. H02J 50/20; H02J 50/12; H02J 7/025; H02J 5/005; H01F 38/14; H04B 5/0075
See application file for complete search history.

(56) References Cited

U.S. PATENT DOCUMENTS 5,973,495 A * 10/1999 Mansfield .............. H01Q 7/005
324/318
8,598,743 B2   12/2013 Hall et al.
(Continued)

FOREIGN PATENT DOCUMENTS

KR   102205164 B1 *  1/2021
KR   102449510 B1 *  9/2022

OTHER PUBLICATIONS

International Search Report and Written Opinion dated Nov. 21, 2018 in co-pending PCT Patent Application No. PCT/US2018/049526.

(Continued)

*Primary Examiner* — Adam D Houston
(74) *Attorney, Agent, or Firm* — Thomas | Horstemeyer, LLP

(57) ABSTRACT

Various examples are provided for wireless power transfer to implants. In one example, a system includes a radio frequency (RF) power source and a transmitter (TX) array comprising an excitation coil and resonant coils distributed about the excitation coil. The TX array can transfer power from the RF power source to a biomedical implant inserted below a skin surface of a subject when the TX array is positioned on the skin surface adjacent to the biomedical implant. A receiver (RX) coil of the biomedical implant can inductively couple with the TX array for the power transfer. The resonant coils can allow power transfer when the RX coil is not aligned with the excitation coil.

20 Claims, 10 Drawing Sheets

Related U.S. Application Data

(60) Provisional application No. 62/554,251, filed on Sep. 5, 2017.

(51) Int. Cl.
  *H02J 50/40* (2016.01)
  *H01F 38/14* (2006.01)

(56) References Cited

U.S. PATENT DOCUMENTS

| | | | | |
|---|---|---|---|---|
| 9,070,505 B2* | 6/2015 | Saitoh | | H01F 38/14 |
| 9,933,378 B2* | 4/2018 | Urano | | B60L 53/124 |
| 2005/0179434 A1* | 8/2005 | Goldie | | G01R 33/385 |
| | | | | 324/318 |
| 2007/0060980 A1* | 3/2007 | Strother | | A61N 1/3787 |
| | | | | 607/34 |
| 2008/0284599 A1* | 11/2008 | Zdeblick | | A61B 5/073 |
| | | | | 340/572.1 |
| 2009/0027279 A1* | 1/2009 | Choi | | H01Q 1/52 |
| | | | | 343/702 |
| 2010/0171596 A1* | 7/2010 | Burke | | H04Q 9/00 |
| | | | | 340/10.4 |
| 2011/0152725 A1* | 6/2011 | Demir | | A61B 5/103 |
| | | | | 600/587 |
| 2012/0007787 A1* | 1/2012 | Schantz | | G01S 5/14 |
| | | | | 343/788 |
| 2012/0146575 A1* | 6/2012 | Armstrong | | A61M 60/178 |
| | | | | 320/108 |
| 2012/0235636 A1* | 9/2012 | Partovi | | H04B 5/0093 |
| | | | | 320/108 |
| 2013/0127411 A1* | 5/2013 | Ichikawa | | H02J 7/00 |
| | | | | 320/108 |
| 2013/0162051 A1* | 6/2013 | Michihata | | H02J 50/80 |
| | | | | 307/104 |
| 2013/0175983 A1* | 7/2013 | Partovi | | H01F 27/366 |
| | | | | 320/108 |
| 2013/0241306 A1* | 9/2013 | Aber | | H02J 7/0047 |
| | | | | 307/104 |
| 2013/0293025 A1* | 11/2013 | Xu | | H02J 50/12 |
| | | | | 307/104 |
| 2013/0335018 A1* | 12/2013 | Ichikawa | | H04B 5/0081 |
| | | | | 320/108 |
| 2014/0084857 A1* | 3/2014 | Liu | | H02J 50/402 |
| | | | | 320/108 |
| 2014/0225454 A1* | 8/2014 | Ichikawa | | H02J 50/90 |
| | | | | 307/104 |
| 2015/0280450 A1* | 10/2015 | Park | | H02J 50/005 |
| | | | | 307/104 |
| 2015/0372497 A1* | 12/2015 | Bae | | H02J 50/12 |
| | | | | 307/104 |
| 2016/0094048 A1* | 3/2016 | Bae | | H02J 50/12 |
| | | | | 307/104 |
| 2016/0135684 A1* | 5/2016 | Kappel | | A61B 5/0015 |
| | | | | 600/509 |
| 2016/0142866 A1* | 5/2016 | Jang | | H02J 50/005 |
| | | | | 455/41.1 |
| 2016/0243949 A1* | 8/2016 | Merkel | | H02J 50/90 |
| 2016/0285317 A1* | 9/2016 | Maniktala | | H02J 50/12 |
| 2016/0322156 A1* | 11/2016 | Yeh | | H01F 38/14 |
| 2017/0288460 A1* | 10/2017 | Yao | | H02J 50/402 |
| 2017/0324170 A1* | 11/2017 | Kerselaers | | H01Q 1/273 |
| 2018/0019624 A1* | 1/2018 | Chen | | H04B 5/0037 |
| 2018/0026680 A1* | 1/2018 | Shirvani | | A61B 5/6861 |
| | | | | 455/41.1 |
| 2018/0351414 A1* | 12/2018 | Park | | H02J 50/005 |
| 2018/0353764 A1* | 12/2018 | Oron | | H04B 5/0056 |
| 2019/0076033 A1* | 3/2019 | Sweeney | | A61B 5/0031 |
| 2019/0081562 A1* | 3/2019 | Palm | | H01F 17/0033 |
| 2019/0317164 A1* | 10/2019 | Leussler | | G01R 33/422 |
| 2019/0379240 A1* | 12/2019 | Liu | | H01F 38/14 |
| 2020/0064920 A1* | 2/2020 | Soltani | | H04B 5/0043 |
| 2020/0152369 A1* | 5/2020 | Ha | | H02J 50/005 |
| 2020/0178006 A1* | 6/2020 | Özden | | H04R 25/554 |
| 2020/0178801 A1* | 6/2020 | Nazari | | A61B 5/1473 |
| 2020/0251929 A1* | 8/2020 | Partovi | | H02J 50/70 |
| 2020/0381956 A1* | 12/2020 | Haerinia | | H02J 7/02 |
| 2021/0085564 A1* | 3/2021 | Beyleveld | | A61M 15/008 |
| 2021/0090055 A1* | 3/2021 | Lee | | G06Q 20/208 |
| 2021/0096107 A1* | 4/2021 | Borigo | | G01N 29/262 |
| 2021/0409072 A1* | 12/2021 | Yun | | H04B 5/0031 |

OTHER PUBLICATIONS

"Coil Design for High Misalignment Tolerant Inductive Power Transfer System for EV Charging," Kafeel Ahmed Kalwar, Saad Mekhilef, Mehdi Seyedmahmoudian, Ben Horan, Energies, Nov. 10, 2016.

"Wireless Power Technology for Biomedical Implants," Anthony N. Laskovski, Tharaka Dissanayake, Mehmet R. Yuce, Biomedical Engineering, edited by Carlos Alexandre Barros de Mello, Chapter 7, pp. 119-131, Oct. 2009.

"Wireless Power Transfer: Metamaterials and Array of Coupled Resonators," Wang, B., Yerazunis, W., Teo, K.H., Mitsubishi Electric Research Laboratories (www.meri.com), Mar. 2013.

* cited by examiner

| | Thickness (mm) | Conductivity (S/m) | | | Dielectric constant ($\varepsilon_r$) | | |
|---|---|---|---|---|---|---|---|
| | | 40.68 MHz | 89 MHz | 125 MHz | 40.68 MHz | 89 MHz | 125 MHz |
| Skin | 1.50 | 0.38 | 0.48 | 0.52 | 124 | 77.2 | 66.1 |
| Fat | 8.50 | 0.06 | 0.07 | 0.07 | 15.4 | 12.9 | 12.4 |
| Muscle | 27.5 | 0.67 | 0.70 | 0.72 | 82.6 | 67.4 | 63.7 |
| Bone | 12.5 | 0.06 | 0.06 | 0.07 | 18.9 | 15.6 | 14.8 |

TABLE I
CONTENTS OF TISSUE EQUIVALENT PHANTOMS BY WEIGHT

| Skin Phantom | | | | Fat Phantom | | | |
|---|---|---|---|---|---|---|---|
| DI Water | Sucrose | NaCl | TX151 | DI Water | Oil | NaOH | Flour |
| 88.7% | 7% | 0.3% | 4% | 13% | 42% | 7% | 38% |

TABLE II
MEASURED DIELECTRIC PROPERTIES OF PHANTOMS

| | Conductivity (S/m) | | | Dielectric constant ($\varepsilon_r$) | | |
|---|---|---|---|---|---|---|
| | 40.68 MHz | 89 MHz | 125 MHz | 40.68 MHz | 89 MHz | 125 MHz |
| Skin | 0.35 | 0.40 | 0.60 | 160 | 80 | 50 |
| Fat | 0.05 | 0.07 | 0.09 | 20 | 18 | 15 |

TABLE III
COMPARISON OF WPT TO BIOMEDICAL IMPLANTS

| | O'Driscoll[10] | Kiani[8] | Ho[14] | Zargham[22] | Monti[9] | This Work[1] 0% MF | This Work[1] 100% MF | This Work[1] 150% MF |
|---|---|---|---|---|---|---|---|---|
| | 2009 | 2010 | 2014 | 2015 | 2015 | | | |
| TX power (W) | 0.250 | 0.2 | 0.5 | 0.1 | 0.08 | 0.1 | | |
| RX power (mW) | 0.14 | 13.8 | 0.3 | 0.8 | 1 | 0.32 | 0.28 | 0.18 |
| Frequency (MHz) | 915 | 13.56 | 1600 | 160 | 403 | 89 | | |
| Distance (mm) | 15 | 10 | 10 | 10 | 10 | 10 | | |
| TX Area (mm$^2$) | 400 | 314.2 | 3600 | 210.25 | 176.7 | 852.6 | | |
| RX Area (mm$^2$) | 4 | 78.5 | 3.14 | 4.36 | 90.5 | 16 | | |
| RX Tech | Unspecified | PCB FR4 | Wire wound | On-chip CMOS | PCB Arlon 880 | On-chip CMOS | | |
| $\eta$(%) | 0.056 | 6.9 | 0.04 | 0.8 | 1.25 | 0.32 | 0.28 | 0.18 |
| FOM = $\frac{\eta(\%) \cdot A_{TX}}{A_{RX}}$ | 5.6 | 27.6 | 68.8 | 38.6 | 2.4 | 17 | 14.9 | 9.6 |

[1]ONLY WORK WITH REPORTED MISALIGNMENT TOLERANCE. RESULTS ARE FOR MF IN BOTH HORIZONTAL AND VERTICAL DIRECTION.

FIG. 13

WIRELESS POWER TRANSFER TO BIOMEDICAL IMPLANTS

CROSS REFERENCE TO RELATED APPLICATIONS

This application is a continuation that claims priority to, and the benefit of, U.S. non-provisional application having Ser. No. 16/644,863, filed Mar. 5, 2020, which is a national stage entry pursuant to 35 U.S.C. § 371 of International Application No. PCT/US2018/049526, filed on Sep. 5, 2018, which claims the benefit of and priority to U.S. provisional Application entitled "Wireless Power Transfer to Biomedical Implants" having Ser. No. 62/554,251, filed Sep. 5, 2017, all of which are hereby incorporated by reference in their entireties.

STATEMENT REGARDING FEDERALLY SPONSORED RESEARCH OR DEVELOPMENT

This invention was made with government support under DE-AC52-06NA25396 awarded by the Department of Energy. The Government has certain rights in this invention.

BACKGROUND

The continuous trend towards low power integrated circuit design has resulted in microsystems for body area networks, RFID transponders, and biomedical implants operating at sub-milliwatt power levels. One design challenge for biomedical implants is the ability to supply sufficient power while maintaining a small form factor. For larger scale systems, battery power is a natural solution. For microsystems, battery power is less attractive due to low energy generation density per unit area. As a result, achieving the small form factor needed for biomedical implants or other microsystems can be difficult to achieve.

SUMMARY

Aspects of the present disclosure are related to wireless power transfer to implants. In one aspect, among others, a system for wireless power transfer to biomedical implants comprises a radio frequency (RF) power source; and a transmitter (TX) array comprising an excitation coil and a plurality of resonant coils distributed about the excitation coil. The TX array can be configured to transfer power from the RF power source to a biomedical implant inserted below a skin surface of a subject when the TX array is positioned on the skin surface adjacent to the biomedical implant. In one or more aspects, each resonant coil of the plurality of resonant coils can be adjacent to the excitation coil and two other resonant coils of the plurality of resonant coils. The excitation coil and individual resonant coils of the plurality of resonant coils can have a substantially square shape. The area of the excitation coil can be approximately 4 times the area of each resonant coil of the plurality of resonant coils. For example, the excitation coil can surrounded by 12 resonant coils.

In various aspects, the excitation coil and the plurality of resonant coils can be formed on a printed circuit board (PCB). The PCB can be configured to affix to the skin surface. The excitation coil and the plurality of resonant coils can be multi-turn coils disposed on both sides of the PCB. The excitation coil and the plurality of resonant coils can comprise two spirally-wound turns on each side of the PCB. In one or more aspects, the RF power source can excite the excitation coil via an RF power amplifier. The biomedical implant can comprise a receiver (RX) coil that inductively couples with the TX array for the power transfer. The RX coil can be an on-chip RX coil. The RX coil can be approximately equal in size to each of the plurality of resonant coils or can be smaller than the resonant coils. The TX array can transfer power to the RX coil with a misalignment factor (MF) of up to 150%, where the MF is the lateral separation of a center of the RX coil from a center of the excitation coil normalized to a size of each of the plurality of resonant coils.

In one or more aspects, the plurality of resonant coils can comprises a first layer of resonant coils located adjacent to the excitation coil, and a second layer of resonant coils located outside the first layer of resonant coils opposite the excitation coil. Individual resonant coils of the first layer or the second layer can be separated from adjacent resonant coils in that layer by a uniform distance. The TX array can be configured to transfer power to the biomedical implant when a receiver (RX) coil extends beyond the second layer of resonant coils, and is not located below the first layer of resonant coils. In various aspects, the system can comprise a flexible substrate, where the TX array is formed on the flexible substrate with the plurality of resonant coils symmetrically surrounding the excitation coil. The plurality of resonant coils can comprise a plurality of concentric layers of resonant coils surrounding the excitation coil.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 13 is a table illustrating a comparison of WPT systems, in accordance with various embodiments of the present disclosure.

DETAILED DESCRIPTION

Figure 1:
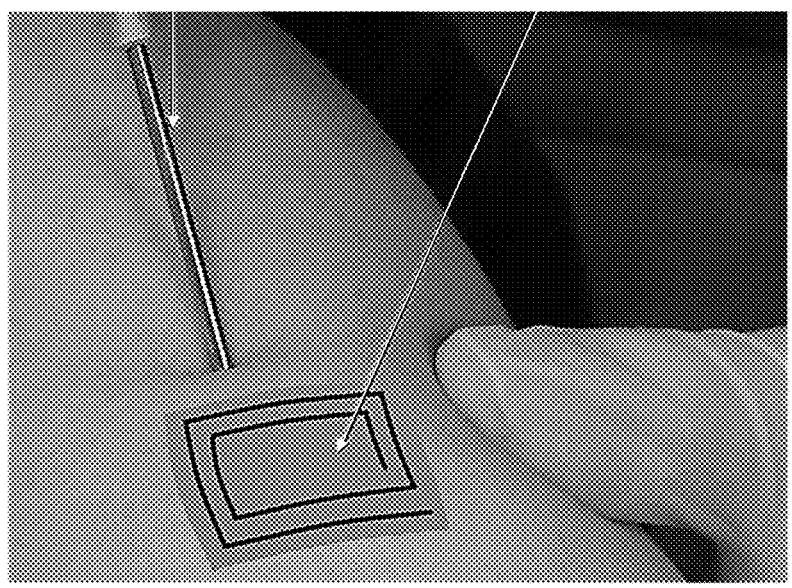
FIG. 1 is an image illustrating an example of a wireless power transfer (WPT) platform for minimally invasive or shallow biomedical implants, in accordance with various embodiments of the present disclosure.

Disclosed herein are various examples related to wireless power transfer to biomedical implants such as, e.g., near-field wireless power transfer to on-chip receiver coils using a transmitter array topology. In order to achieve a small form factor for biomedical implants or other microsystems, wireless power transfer (WPT) techniques can be utilized. However, conventional WPT systems are limited by the degradation of power transfer efficiency due to misalignment between the transmitter and receiver coils. While WPT offers the additional advantage of untethered operation, orientation and location of a biomedical implant may not be precisely known. This problem is further compounded by the small implant size.

In addition, in vivo WPT occurs through tissue with distinct dielectric properties leading to higher losses, and lower power transfer efficiency, in contrast to conventional WPT through air. Several frequency bands such as, e.g., ISM 13.56 MHz, MedRadio 401-406 MHz and ISM 902-928 MHz have been considered for WPT to biomedical implants. The choice of the transmission frequency is a trade-off between the power requirement, human body impact, implant size, transmission medium, and transmission distance. At frequencies below 1 MHz, large implant sizes are needed to obtain sufficient power. At microwave frequencies, the body absorbs electromagnetic energy, increasing transmission loss. An optimum frequency can be determined that maximizes efficiency while keeping energy density below the specific absorption rate (SAR) to prevent tissue damage. As always, patient comfort and safety are important considerations in the design of biomedical implants.

Reference will now be made in detail to the description of the embodiments as illustrated in the drawings, wherein like reference numbers indicate like parts throughout the several views. A transmitter array topology is disclosed for wireless power transfer to lateral or 2D misaligned implants. In this topology, a single excitation coil resonantly couples energy throughout the array. The power transfer efficiency can be enhanced by optimizing the transmitter-receiver coupling coefficient, and the power transfer ratio between the array elements. To demonstrate the performance of the disclosed array topology under different misalignment factors, a transmitter array with an area of 852.6 $mm^2$ was fabricated on an FR4 substrate. The transmitter array supplied power to a 4 mm×4 mm subcutaneous implant with an on-chip receiver fabricated in 90-nm CMOS technology. A variation in power transfer efficiency of less than 2.6 dB was obtained with 150% misalignment factor in both horizontal and vertical directions.

Referring to FIG. 1, shown is an example of a WPT platform for minimally invasive or shallow biomedical implants that can be used for diagnostic and therapeutic purposes such as, e.g., glucose monitoring. A key attraction of these implant types is the ability to continuously monitor biological processes not readily accessible outside the body. An external transmitter, worn as a flexible skin patch, wirelessly powers the implant via inductive coupling between the transmitter and an implanted coil. As illustrated in FIG. 1, the biomedical implant is inserted just beneath the patch using an implant insert instrument. Biomedical implants with wireless power capability have the potential to eliminate secondary battery replacement surgeries lasting on average between one to three hours, and hospitalization of several days.

Figure 2A:
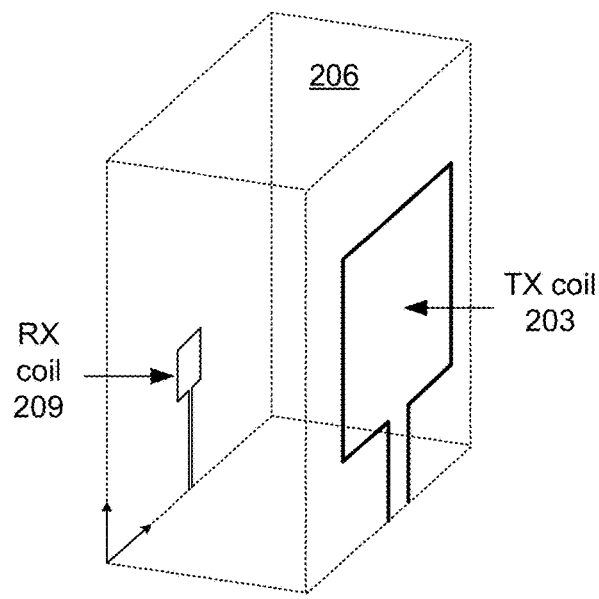
FIGS. 2A and 2B are graphical representations of examples of WPT topologies comprising a transmitter (TX) coil and TX array respectively, in accordance with various embodiments of the present disclosure.

In controlled inductive WPT systems, it is desirable that transmitter and receiver coils are aligned to maximize the mutual coupling and power transfer efficiency (PTE). In practical implementations transmitter and receiver coils may not be aligned. Therefore, development of advanced WPT techniques to improve transmitter-receiver coupling and PTE between misaligned coils is beneficial. A conventional WPT approach for powering an implant with a single transmitter (TX) coil 203 through the tissue 206 is illustrated in FIG. 2A. The conventional method uses a larger transmitter (TX) coil 203 to supply power to an implant via a smaller receiver (RX) coil 209 to reduce the effect of misalignment. This results in a large amount of leakage flux that does not couple with the smaller RX coil 209.

Figure 2B:
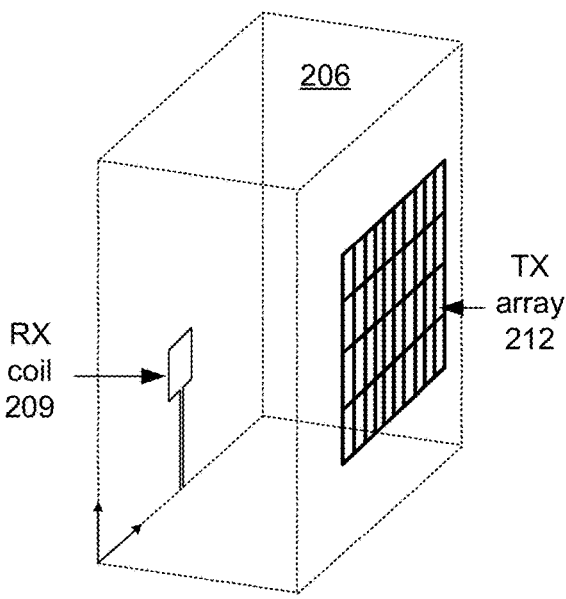

FIG. 2B illustrates an example of a TX array 212 that can be used to supply power to the implant via the RX coil 209. The disclosed topology uses an array of resonant transmitter elements to enhance the transmitter-receiver coupling coefficient. An overview of the WPT system with the RX coil 209 and TX array 212 separated by a transmission medium (e.g., tissue) 206, and its performance, will be presented. A procedure to determine optimum load for maximum power transfer efficiency, in a WPT system with an arbitrary RX coil 209 and TX array 212 will also be discussed. In addition, simulation and experimental results of the implemented WPT system in tissue equivalent phantoms designed to mimic biological media are presented.

As illustrated in FIG. 2B, a transmitter array topology is proposed to improve efficiency and mitigate performance degradation due to lateral transmitter-receiver misalignment. The TX array 212 can be fabricated on an FR4 board, while the RX coil 209 can be an on-chip coil fabricated in 90-nm CMOS technology. As shown in FIG. 2A, conventional WPT uses a single large transmitter coil 203 leading to a low PTE due to poor transmitter-receiver flux linkage, while the transmitter topology with the TX array 212 of FIG. 2B uses elements of similar size leading to stronger near-field coupling between transmitter array 212 and receiver coil 209.

Figure 3:
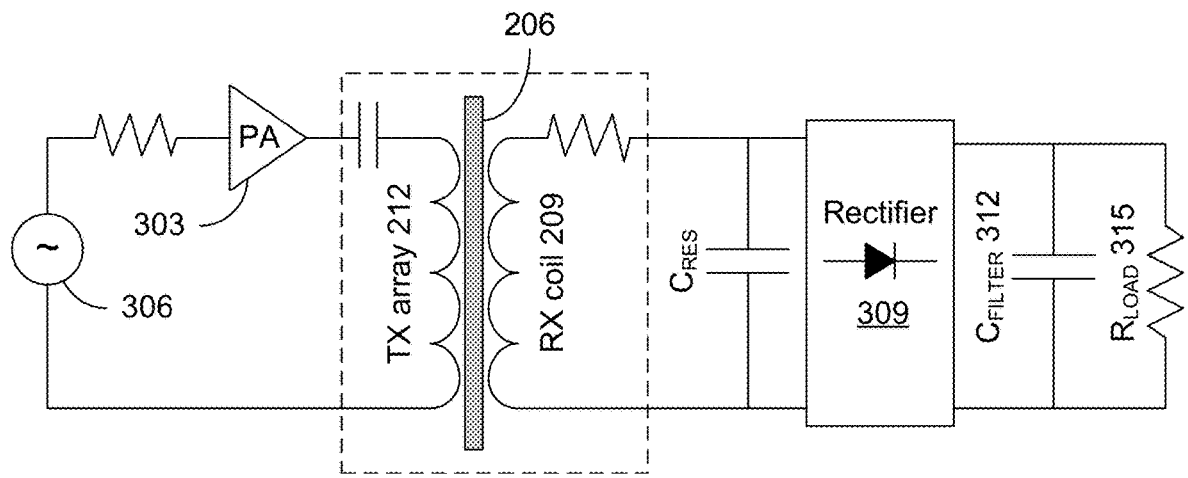
FIG. 3 is a schematic diagram illustrating an example of a WPT system comprising a TX array, in accordance with various embodiments of the present disclosure.

Referring to FIG. 3, shown is a schematic diagram illustrating an example of the WPT system. A series-parallel compensation topology can be utilized for voltage amplification at low power levels. For power transmission, an RF power amplifier 303 with low output resistance can be used to drive the TX array 212 from a RF source 306. In the implant, a rectifier 309 and filter capacitor 312 provide RF to DC conversion of power received by the on-chip RX coil 209 to supply an arbitrary sensor load 315. A tissue equivalent phantom was embedded between the TX array 212 and RX coil 209 to emulate WPT through a biological media 206.

In a single transmitter and receiver WPT system, the maximum power transfer efficiency can be estimated by:

$$\eta_{max} = \frac{k^2 Q_t Q_r}{\left(1 + k^2 Q_t Q_r\right)},$$

where k is the coupling coefficient, $Q_t$ is the loaded quality factor of the TX coil 203, and $Q_r$ is the loaded quality factor of the on-chip RX coil 209. System performance is therefore heavily dependent on transmitter quality factor, receiver quality factor, and transmitter-receiver coupling coefficient which in turn depends on the transmission medium 206.

Figure 4A:
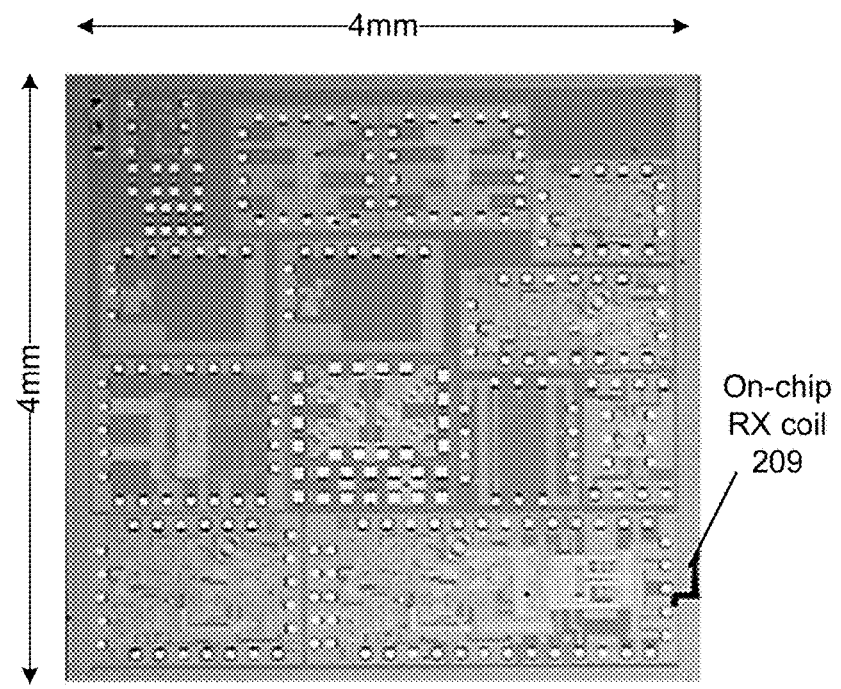
FIG. 4A is a die micrograph of an example of an on-chip receiver (RX), in accordance with various embodiments of the present disclosure.

On-Chip Receiver Coil. A die micrograph of the on-chip receiver (RX) is shown in FIG. 4A. The on-chip receiver coil 209 was fabricated in 90-nm CMOS technology with an overall size of 4 mm×4 mm. For simplicity, a single layer 4-turn on-chip coil 209 was fabricated with a track thickness of 3.25 μm, track width of 25 μm, and track spacing of 35 μm. The topmost metal layer, metal 9, was used to minimize sheet resistance. A large core area was reserved for energy storage, power management, sensor readout, and data telemetry.

Figure 4B:
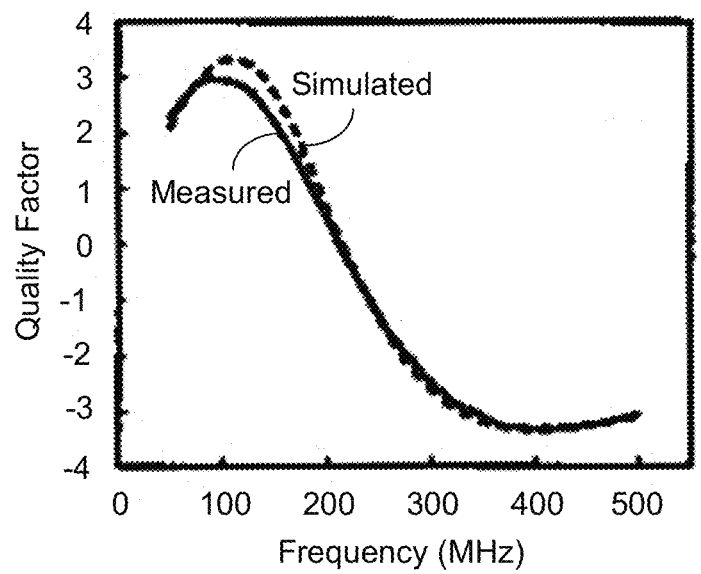
FIGS. 4B-4D are plots illustrating simulated and measured data for quality factor, input resistance, and input reactance of an on-chip RX coil of FIG. 4A, in accordance with various embodiments of the present disclosure.
Figure 4C:
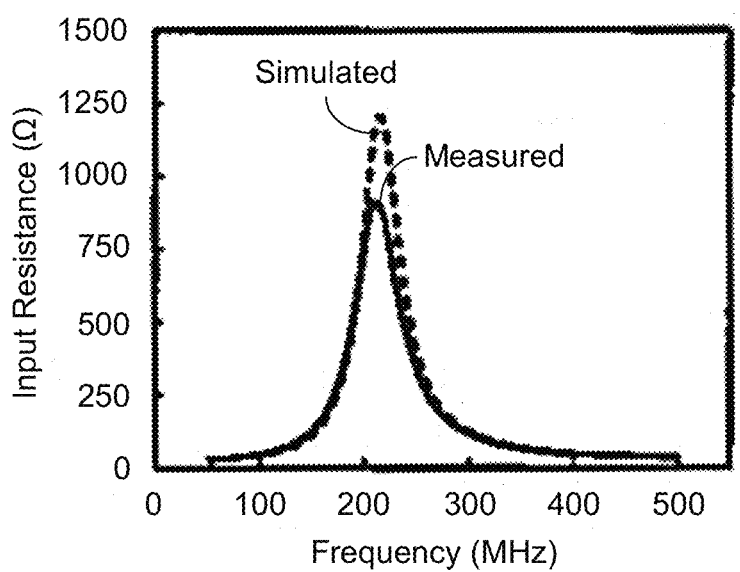
Figure 4D:
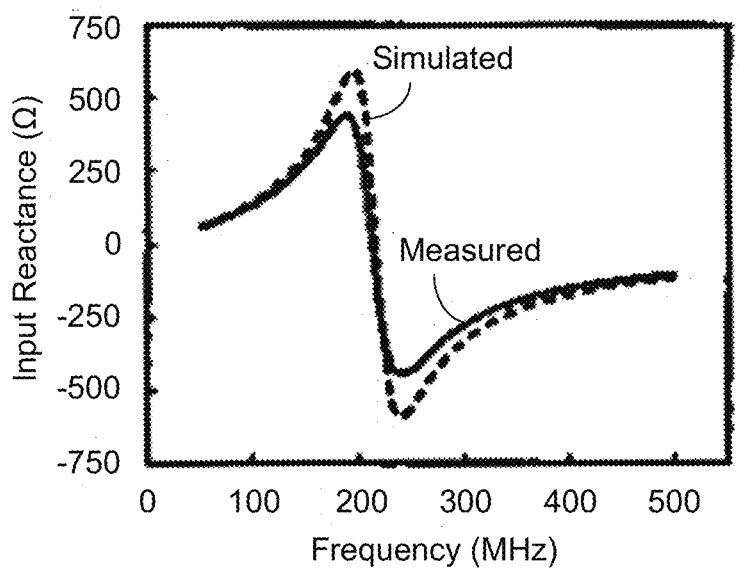

Measured and simulated data of quality factor, input resistance, and input reactance of the on-chip RX coil are shown in FIGS. 4B, 4C and 4D, respectively. The on-chip RX coil 209 had a self-resonant frequency (SRF) of 235 MHz, effectively restricting the operating frequency to below 200 MHz for a quality factor greater than unity. On-chip coils have lower quality factors and self-resonant frequencies than their off-chip counterparts due to thinner metal layers, high turn density, and layer-to-substrate parasitic capacitance. The quality factor is also degraded due to the tissue dielectric environment. Despite their low quality factors, miniaturization of implantable coils using integrated circuit technologies yields a compact millimeter scale design attractive for biomedical implants and other microsystems.

Figure 6A:
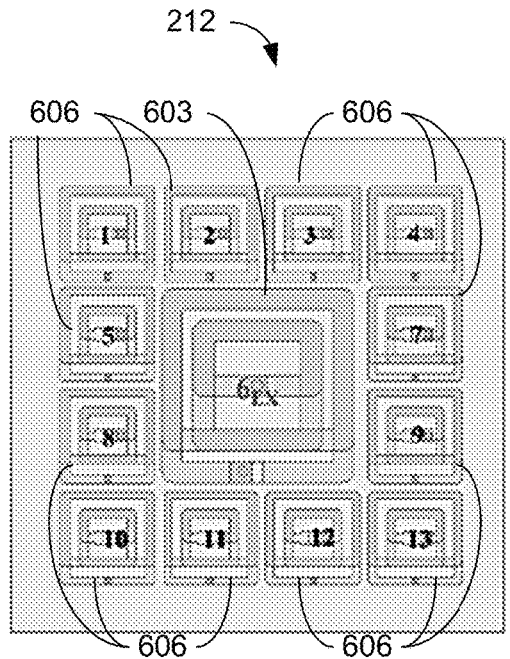
FIG. 6A illustrates an example of a transmitter (TX) array comprising an excitation coil and resonant coils, in accordance with various embodiments of the present disclosure.

Transmitter Array. Referring now to FIG. 6A, shown is an example of a transmitter (TX) array 212, which comprises an excitation coil 603 and resonant coils 606. FIG. 6A shows the layout of the fabricated TX array 212 on an FR4 printed circuit board (PCB) substrate. The excitation coil 603 is located at the center of the TX array 212, while the resonant coils 606 are surrounding elements. An input or excitation signal is provided to the excitation coil 603, and the resonant coils 606 couple electromagnetic energy throughout the TX array 212.

In the example of FIG. 6A, the TX array 212 comprises 12 resonant coils 606 surrounding the excitation coil 603. The TX array 212 can equivalently be described as having an overall size of 4×4 resonant elements 606, with a center excitation coil 603 equivalent in size to four resonant elements 606. The coils 603 and 606 have a square shape, which allows the resonant coils 606 to be tightly distributed in a symmetrical configuration about the excitation coil 603. For example, the resonant elements or coils 606 can each have a size of 6.7 mm×6.7 mm and the excitation element or coil 603 can have a size of 13.4 mm×13.4 mm, yielding a total TX array size of 29.2 mm×29.2 mm. Other geometric coil shapes (e.g., rectangular, hexagonal, octagonal, etc.) may also be utilized. While a single layer of resonant coils 606 is shown surrounding the excitation coil 603, multiple layers of resonant coils 606 may be provided in other implementations.

Figure 5:
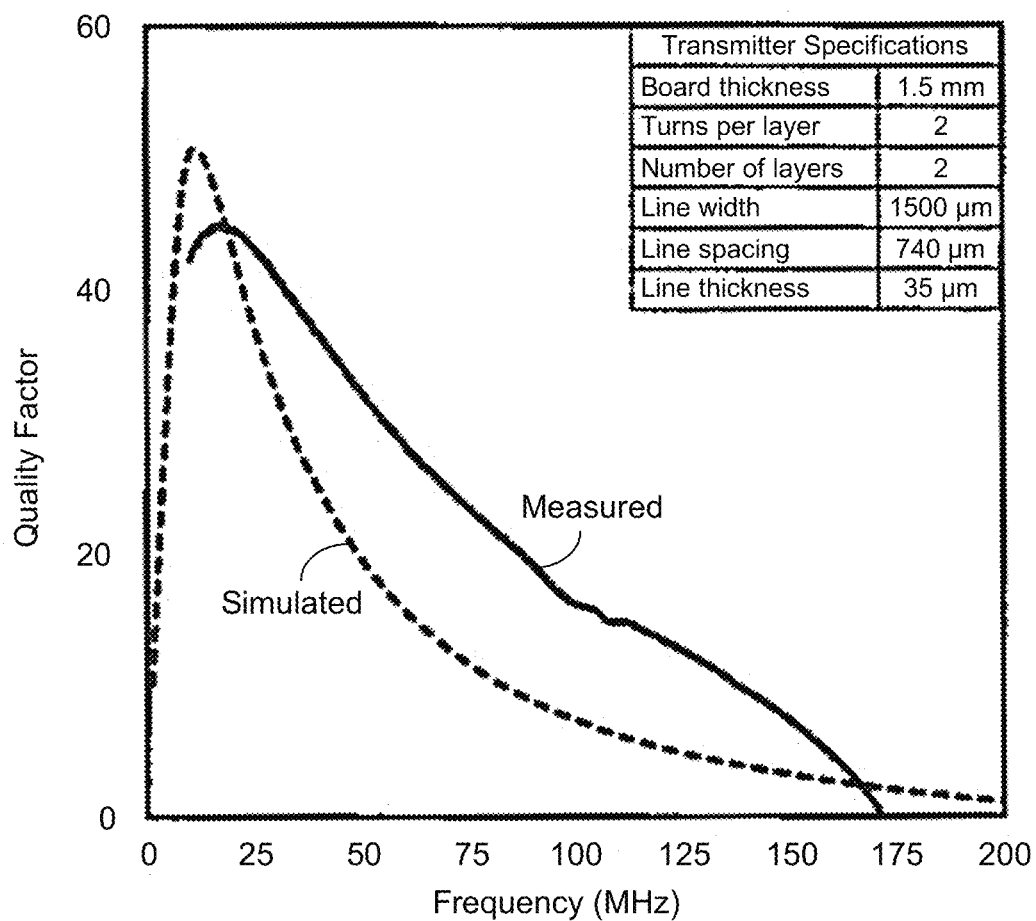
FIG. 5 is a plot illustrating simulated and measured data for quality factor of an excitation coil of a TX array, in accordance with various embodiments of the present disclosure.
Figure 6B:
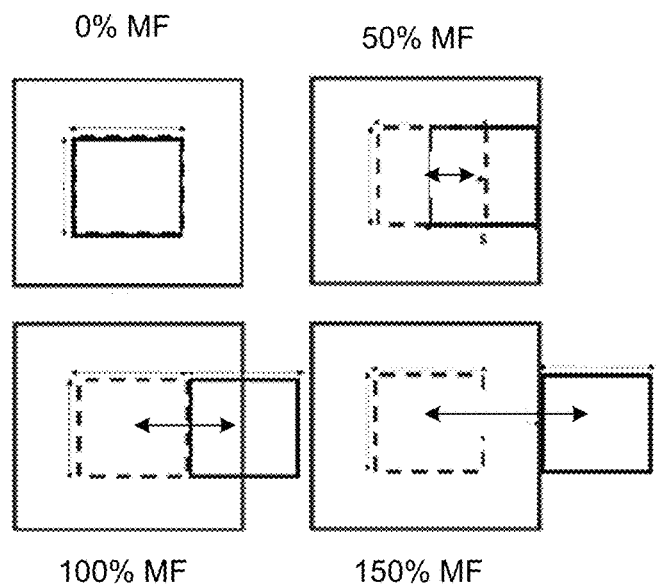
FIG. 6B includes schematic diagrams illustrating examples of a misalignment factor (MF) between a TX array (or excitation coil) and a receiver coil, in accordance with various embodiments of the present disclosure.

Measured and simulated data for the quality factor of the excitation element 603 is shown in FIG. 5. The inset table provides transmitter specifications of track width, spacing, and thickness for the excitation coil 606. Quality factor was computed from the measured coil resistance and reactance values. Measured resistance was on the order of 0.5Ω, which was a bit low for proper resolution by a network analyzer. To characterize the PTE between the transmitter array and a receiver coil, a misalignment factor (MF) is introduced to quantify position variation. The MF is defined as the lateral separation of the RX coil 209 from the transmitter center (center of TX array 212 or excitation coil 603) normalized to the resonant element size. FIG. 6B includes schematic diagrams illustrating four examples of different transmitter-receiver horizontal MFs.

The misalignment factor (MF) can be expressed as a percentage, and can be specified in one or more directions (e.g., horizontal and/or vertical). Various transmitter-receiver horizontal MFs are illustrated in FIG. 6B. The larger square with the solid line represents the outer dimensions of the excitation element 603, the square with the dashed line represents a portion of excitation element 603 with an equivalent size as the RX coil 209, and the smaller square with the solid line represents the outer dimensions of the RX coil 209 position. The TX array topology provides field coverage of up to 150% MF in both horizontal and vertical directions as illustrated in FIG. 6B. The upper left diagram illustrates 0% MF with the excitation coil 603 aligned with the RX coil 209. The upper right diagram illustrates 50% MF with the RX coil 209 offset from the transmitter center and aligned with one edge of the excitation coil 603. The lower left diagram illustrates 100% MF with the excitation coil 603 overlapping half of the RX coil 209. In this case, a portion of the resonant coils 606 overlaps the other half of the RX coil 209. The lower right diagram illustrates 150% MF with the RX coil 209 misaligned with the excitation coil 603 and adjacent to one or more resonant coils 606. Additional field coverage is possible using more resonant elements 606 with an added penalty of lower power transfer efficiencies. The choice of transmitter size can depend on the anticipated misalignment tolerance, and a desired power transfer efficiency.

Figure 7:
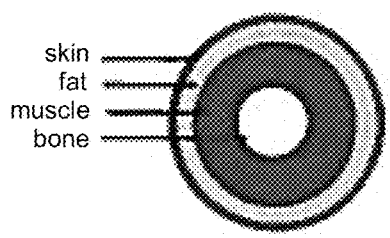
FIG. 7 illustrates a simplified cross-section of an average human arm with a table indicating frequency dependent tissue dielectric properties per layer, in accordance with various embodiments of the present disclosure.

Tissue Equivalent Phantom. The implemented WPT system comprising the TX array 212 of FIG. 6B was evaluated using tissue equivalent phantoms to emulate wireless power transfer to a subcutaneous implant inserted underneath the skin of an individual. Design of tissue equivalent phantoms at frequencies ranging from 30 MHz to 300 MHz was needed due to the significant difference in dielectric properties between live and posthumous tissue just 1 hour after death. A simplified cross-section of an average human arm is shown in FIG. 7. This simplified abstraction comprises four layers, namely skin, fat, muscle and bone. The table at the bottom of FIG. 7 indicates the thickness and frequency dependent tissue dielectric properties specified per layer.

As can be understood, an important objective in tissue equivalent phantom design is to create phantoms with dielectric properties that approximate actual tissue for a desired frequency range. In the example of FIG. 7, the target conductivity and relative permittivity for each tissue layer is specified at 40.68 MHz, 89 MHz, and 125 MHz. These phantom design points were chosen to evaluate performance of the implemented WPT system. As seen in FIG. 4B, the RX coil 209 has an optimum unloaded quality factor in air of 3 at 110 MHz. This quality factor will be degraded by the dielectric loading of the tissue equivalent phantom.

Design and Optimization. The transmitter operates on the principle of resonant magnetic coupling. The magnetic field originating from the excitation coil 603 couples throughout the transmitter array 212 and to the receiver. From Kirchhoff's circuit laws, a system of linear equations describing energy distribution for an inductively coupled WPT system can be written as:

$$ZI = V = \begin{bmatrix} Z_{11} & Z_{12} & Z_{13} & Z_{14} \\ Z_{21} & Z_{22} & Z_{23} & Z_{24} \\ Z_{31} & Z_{32} & Z_{33} & Z_{34} \\ Z_{41} & Z_{42} & Z_{43} & Z_{44} \end{bmatrix} \begin{bmatrix} I_1 \\ I_2 \\ I_3 \\ I_4 \end{bmatrix} = \begin{bmatrix} V_1 \\ 0 \\ 0 \\ 0 \end{bmatrix}. \quad (1)$$

Z denotes the impedance matrix, I denotes the current phasor vector, and V denotes the voltage phasor vector. $V_1$ corresponds to the excitation coil voltage and $I_1$ corresponds to the excitation coil current. Self-impedance of each coil, $Z_{ii}=R_i+j\omega L_i-1/j\omega C_i$ is a function of self-inductance, parasitic resistance, and resonant capacitance. Mutual-impedance between coils, $Z_{ij}=j\omega k\sqrt{L_iL_j}=j\omega M_{ij}$ for $i \neq j$, is a function of self-inductances and coupling coefficient.

A modified impedance matrix $\hat{Z}$ is obtained after deleting row one from the impedance matrix Z as shown in:

$$\hat{Z}I = \begin{bmatrix} Z_{21} & Z_{22} & Z_{23} & Z_{24} \\ Z_{31} & Z_{32} & Z_{33} & Z_{34} \\ Z_{41} & Z_{42} & Z_{43} & Z_{44} \end{bmatrix} \begin{bmatrix} 1 \\ I_2/I_1 \\ I_3/I_1 \\ I_4/I_1 \end{bmatrix} = 0. \quad (2)$$

The null space of $\hat{Z}$, $N(\hat{Z})$, expressed as a vector of current transfer ratios with respect to excitation current is a solution to the matrix equation. For a WPT system with N transmitter array elements and one receiver coil, $\hat{Z}$ has N by N+1 dimensions since its matrix is augmented by an additional row and column due to mutual impedances between the receiver and transmitter array elements. The current transfer ratio (CTR) can then be given by 1, $I_2/I_1$, $I_3/I_1$, ..., $I_N/I_1$. Total power consumption is the sum of power delivered to the load, power dissipated by the transmitter, and power dissipated by the receiver. The power transfer efficiency can be specified as:

$$\eta = \frac{|I_{LOAD}|^2 \cdot R_{LOAD}}{\left[\sum_{i=1}^{N+1}|I_i|^2 \cdot R_i\right] + |I_{LOAD}|^2 \cdot R_{LOAD}}, \quad (3)$$

which is consistent with PTE derivation by K. Lee et al in "Analysis of Wireless Power Transfer for Adjustable Power Distribution among Multiple Receivers" (*IEEE Antennas Wirel. Propag. Lett.*, vol. 14, pp. 950-953, 2015). PTE can be rewritten as:

$$\eta = \frac{R_{LOAD}}{\left[\left|\frac{I_1}{I_{LOAD}}\right|^2 \sum_{i=1}^{N+1}\left|\frac{I_i}{I_1}\right|^2 \cdot R_i\right] + R_{LOAD}}, \quad (4)$$

which a function of CTR squared or power transfer ratio between transmitter coils, parasitic resistance, and load resistance.

A series equivalent load impedance, $Z_{OPT}=R_{LOAD-OPT}+jX_{LOAD-OPT}$, has been derived for maximum power transmission efficiency in a single transmitter-receiver topology. This optimum impedance can be restated as:

$$R_{LOAD-OPT} = \frac{\sqrt{(rZ_{11}rZ_{22}+iZ_{12}^2)(rZ_{11}rZ_{22}-rZ_{12}^2)}}{rZ_{11}}, \quad (5)$$

$$X_{LOAD-OPT} = \frac{iZ_{12}rZ_{12}}{rZ_{11}} - iZ_{22}, \quad (6)$$

with the real and imaginary parts of Z-parameters prefixed by r and i, respectively. The optimum load impedance range can be derived from:

$$R_{LOAD-OPT} = \frac{\sqrt{(A+B)(A-C)}}{rZ_{11}} \quad (7)$$

$$A = rZ_{11}rZ_{N+1,N+1} \quad B = iZ_{1,N+1}^2 \quad C = rZ_{1,N+1}^2$$

$$rZ_{N+1,N+1} < R_{LOAD-OPT} < \frac{A\sqrt{1+\frac{B}{A}}}{rZ_{11}} \quad (8)$$

$$B = \left(\omega k_{1,N+1}\sqrt{L_1 L_{N+1}}\right)^2 \quad (9)$$

$$C = \left(k_{1,N+1}\sqrt{\frac{L_{N+1}}{L_1}}rZ_{N+1,N+1}\right)^2$$

$$k_{max} = \max(k_{1,N+1}) \geq k_{1,N+1}, 1 \leq i \leq N \quad (10)$$

$$rZ_{N+1,N+1} < R_{LOAD-OPT} < rZ_{N+1,N+1}\sqrt{1+\frac{(\omega k_{max}\sqrt{L_1 L_{N+1}})^2}{rZ_{11}rZ_{N+1,N+1}}} \quad (11)$$

$$-iZ_{N+1,N+1} < X_{LOAD-OPT} < \frac{\sqrt{BC}}{rZ_{11}} - iZ_{N+1,N+1}, \quad (12)$$

$$-iZ_{N+1,N+1} < X_{LOAD-OPT} < \frac{\omega k_{max}^2 L_{N+1}rZ_{N+1,N+1}}{rZ_{11}} - iZ_{N+1,N+1}, \quad (13)$$

A bounded scanning algorithm, executable by a computing device or other processing circuitry, can be implemented to calculate the optimum load in a multi transmitter-receiver topology from equations (7) through (13). In equation (11), the optimum load resistance $R_{LOAD-OPT}$ is bounded by the parasitic resistance of the receiver coil. The impedance range is a function of receiver self-inductance, receiver parasitic resistance, transmitter self-inductance, transmitter parasitic resistance, and maximum coupling coefficient. A series-parallel conversion can be applied to obtain component values consistent with the WPT system of FIG. 3.

Figure 8:
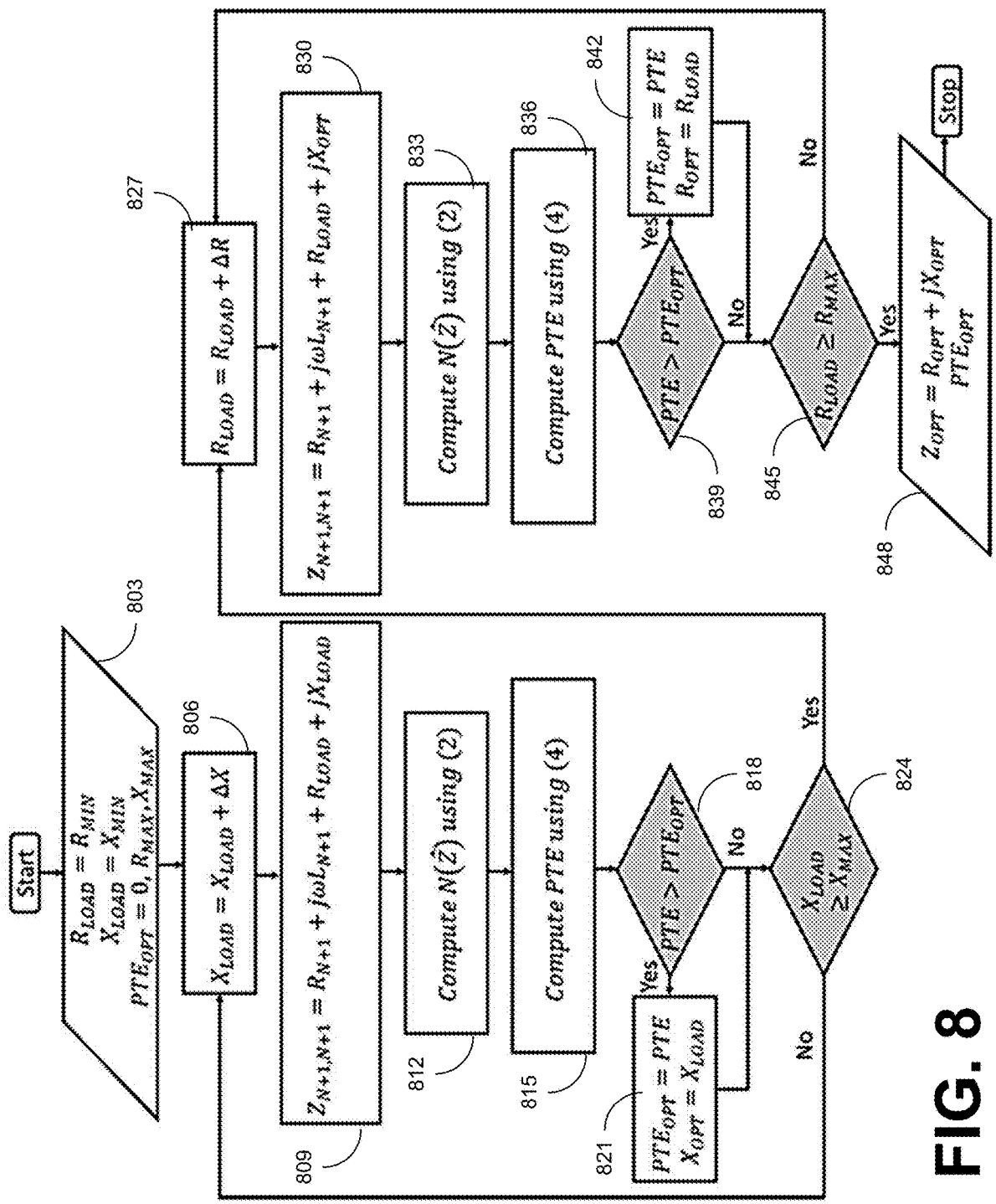
FIG. 8 is a flow diagram illustrating an example of the determination of an optimal load impedance and power transfer efficiency (PTE), in accordance with various embodiments of the present disclosure.

FIG. 8 shows a flow chart illustrating an example of the determination of the optimum load, which can prove useful since a closed form expression for a transmitter array topology with many elements is complex. Beginning at 803, the load resistance, load reactance and optimal power transfer efficiency ($PTE_{OPT}$) are initialized. The load reactance is incremented (e.g., by a defined value) at 806 and the coil self-impedances are determined at 809. The null space of the modified impedance matrix of equation (2) is determined at 812 and the PTE is determined at 815 using equation (4), which is compared to $PTE_{OPT}$ at 818. If the PTE is greater than the $PTE_{OPT}$, then the optimal power transfer efficiency and optimal load reactance are set to the power transfer efficiency and load reactance at 821 before comparing the load reactance to a maximum reactance value at 824. If the PTE is not greater at 818, then the flow proceeds to 824 for the comparison. If the load reactance is less than the maximum reactance value, then the flow returns to 806 where the load reactance is again incremented.

If the load reactance is greater or equal to the maximum reactance value, then the load resistance is incremented (e.g., by a defined value) at 827 and the coil self-impedances are determined at 830 using the optimal load reactance. The null space of the modified impedance matrix of equation (2) is again determined at 833 and the PTE is determined at 836 using equation (4), which is compared to $PTE_{OPT}$ at 839. If the PTE is greater than the $PTE_{OPT}$, then the optimal power transfer efficiency and optimal load resistance are set to the power transfer efficiency and load resistance at 842 before comparing the load resistance to a maximum resistance value at 845. If the PTE is not greater at 839, then the flow proceeds to 845 for the comparison. If the load resistance is less than the maximum resistance value, then the flow returns to 827 where the load resistance is again incremented. If the load reactance is greater or equal to the maximum reactance value, then the optimal load impedance is defined using the optimal load resistance and the optimal load reactance at 848. As can be understood by those reasonably skilled in the art of the present disclosure, alternate implementations are included within the scope of the present disclosure in which descriptions or blocks in flow chart may be executed out of order from that shown or discussed, including substantially concurrently or in reverse order, depending on the functionality involved.

Simulation and Measurement Results. Full-wave electromagnetic simulations were performed using ANSYS HFSS to obtain the impedance matrix $\hat{Z}$ as a function of operation frequency, transmission distance, and lateral misalignment. The reactive component of self-impedance for each array element 603 and 606 (FIG. 6A) was then used to compute its resonant capacitance. The impedance matrix was imported into MATLAB and the scanning algorithm procedure illustrated in FIG. 8 was implemented to determine the optimum load impedance and power transfer efficiency. The above procedure was performed for each operation frequency, transmission distance, and lateral misalignment to characterize the WPT system.

Figure 9:
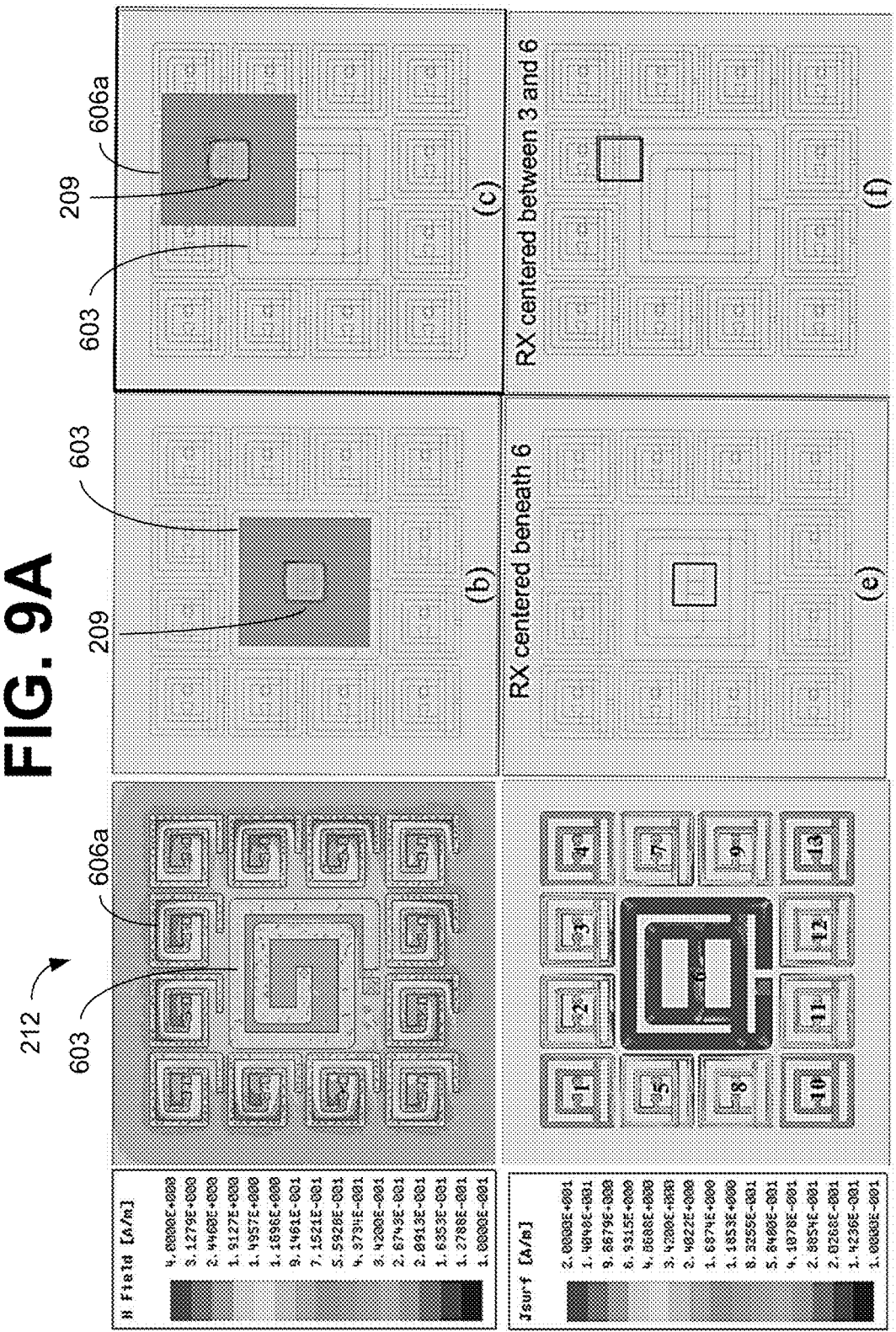
FIGS. 9A and 9B graphically illustrate examples of electromagnetic simulation results for magnetic field intensity and surface current density of a TX array of FIG. 6A, respectively, in accordance with various embodiments of the present disclosure.

Results of the full-wave electromagnetic simulations showing magnetic field intensity and surface current density of the transmitter array and the on-chip receiver coil are shown in FIGS. 9A and 9B. The magnetic field intensity is plotted in FIG. 9A and the surface current density is plotted in FIG. 9B. The electromagnetic field distribution or surface current density of the TX array 212 is shown on the left. Through the mechanism of resonant inductive coupling, electromagnetic energy is coupled from the excitation element 603, throughout the array structure.

The electromagnetic field distribution (and current density) of the RX coil 209 when positioned 10 mm underneath the excitation coil 603 at the center of TX array 212 is shown at the center of FIGS. 9A and 9B. This alignment has a 0% MF, or perfect alignment, which is consistent with FIG. 6B. The field distribution (and current density) of the RX coil 209 when positioned between the excitation coil 603 and resonant coil 606a of the TX array 212 is shown on the right of FIGS. 9A and 9B. This alignment has a 100% horizontal and vertical MF.

Figure 10:
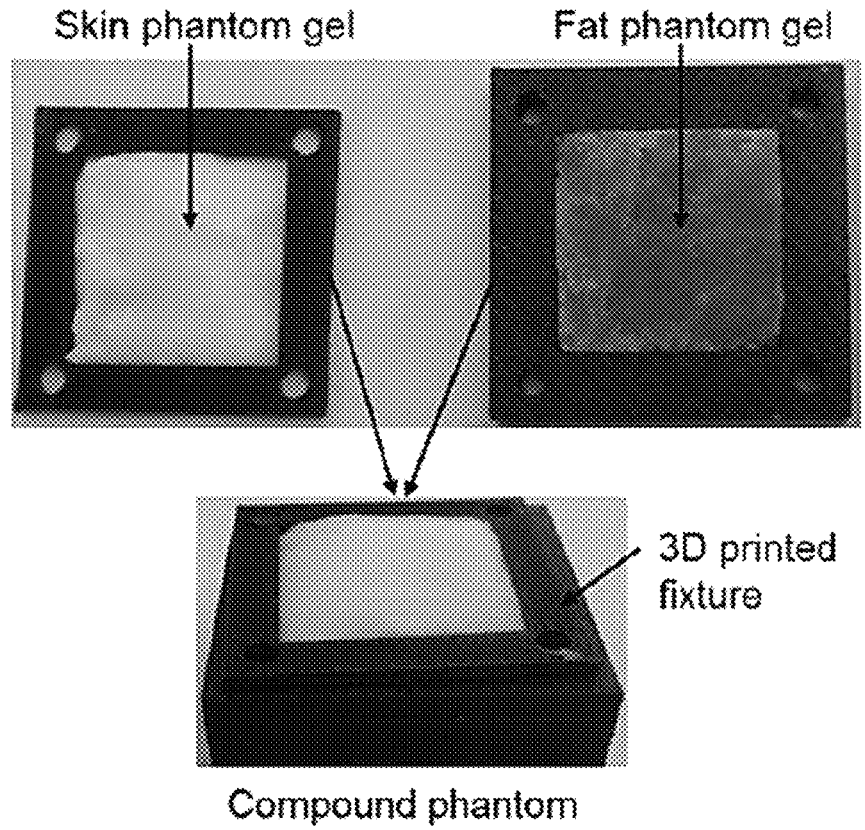
FIG. 10 illustrates the construction and properties of an example of a compound tissue equivalent phantom, in accordance with various embodiments of the present disclosure.

Tissue equivalent phantoms were designed to mimic dielectric properties of biological media. Referring to FIG. 10, shown is an image of an example of a compound tissue equivalent phantom comprising skin and fat phantom layers. Phantom development was restricted to skin and fat layers since the biomedical application space is subcutaneous implants at a depth of about 10 mm from the skin's surface. Individual phantom layers were formed by pouring phantom gels into 30 printed fixtures made from ABS plastic. The skin and fat fixtures have thicknesses of 1.5 mm and 8.5 mm, respectively. Once these layered phantom gels solidify, a compound phantom was formed is illustrated in FIG. 10.

A hydrous based phantom was designed for the skin layer, and an oil based phantom was designed for the fat layer. Table I of FIG. 10 lists the percent weight proportions for skin and fat tissue equivalent phantoms. The hydrous skin phantom consists of deionized (DI) water, sucrose, TX-151 powder, and sodium chloride. Sucrose can be used to control relative permittivity, sodium chloride can be used to control conductivity, and TX-151 can be used to control gelation. The oil based fat phantom consists of oil, flour, deionized water, and sodium hydroxide. Sodium hydroxide can be used as a surfactant, while oil and flour can both be used to control permittivity.

Measured phantom dielectric properties at 40.68 MHz, 89 MHz, and 125 MHz are shown in Table II of FIG. 10. The phantom dielectric properties were determined from measured scattering parameters and the conductivity was calculated using the Debye relation ("Agilent Basics of Measuring the Dielectric Properties of Materials," Agilent, pp. 1-31). The measured conductivity and relative permittivity are a reasonable approximation of the target tissue dielectric properties of FIG. 7.

Figure 11:
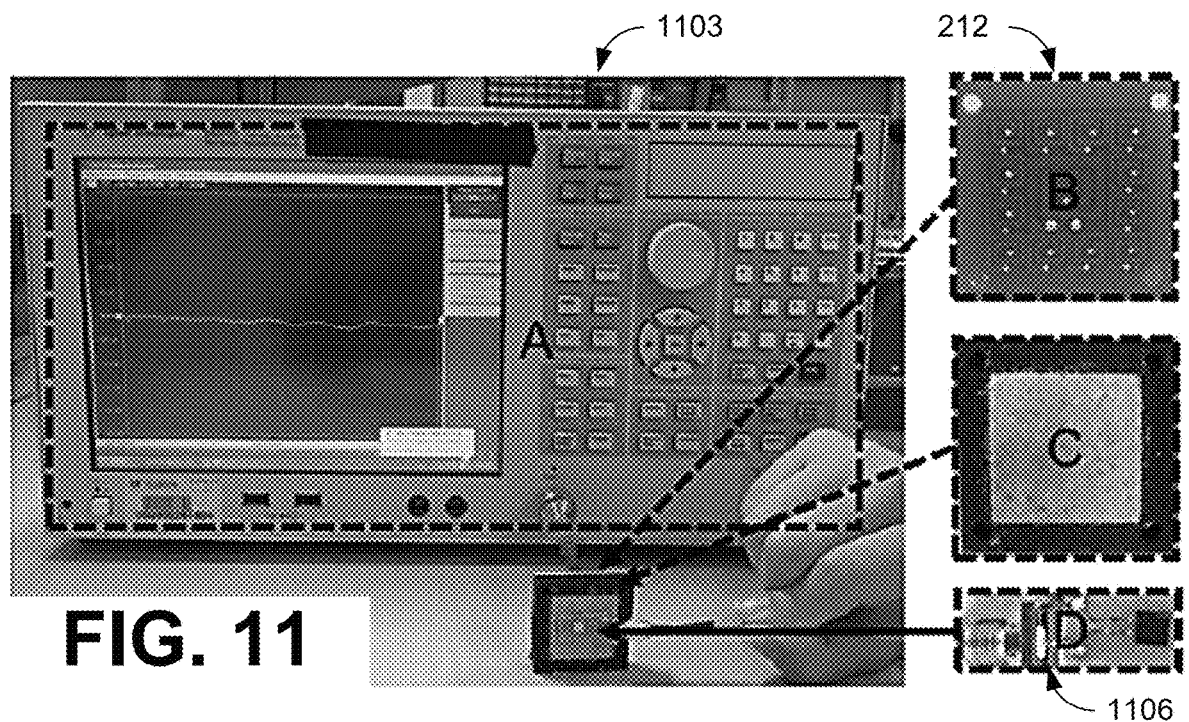
FIG. 11 illustrates an example of an experimental test setup for evaluation of WPT systems, in accordance with various embodiments of the present disclosure.

An experimental test setup for the wireless power transmission system is shown in FIG. 11. An RF signal source 1103 drives the TX array 212 shown in the upper right view through two terminal connections of the excitation coil 603. An enlarged view of the compound tissue equivalent phantom and its enclosing fixture is shown in the middle right view. The compound phantom was positioned between the TX array 212 and the on-chip RX coil 209 to mimic the biological media. The on-chip RX coil 209 in the bottom right view was packaged as a chip-on-board 1106 with an SMA connector for measuring the receiver signal level. An expanded view of the receiver die micrograph was shown in FIG. 4A.

An equivalent loop with an area of 852.6 mm², a track width of 1.5 mm, a track spacing of 3 mm, a track thickness of 35 μm, and 2 turns per layer on an FR4 substrate was designed as a comparison baseline for the TX array 212. Performance of the equivalent loop and TX array 212 was determined at 0% MF which corresponds to perfect alignment, 50% MF, 100% MF, and 150% MF in both horizontal and/or vertical directions.

Figure 12:
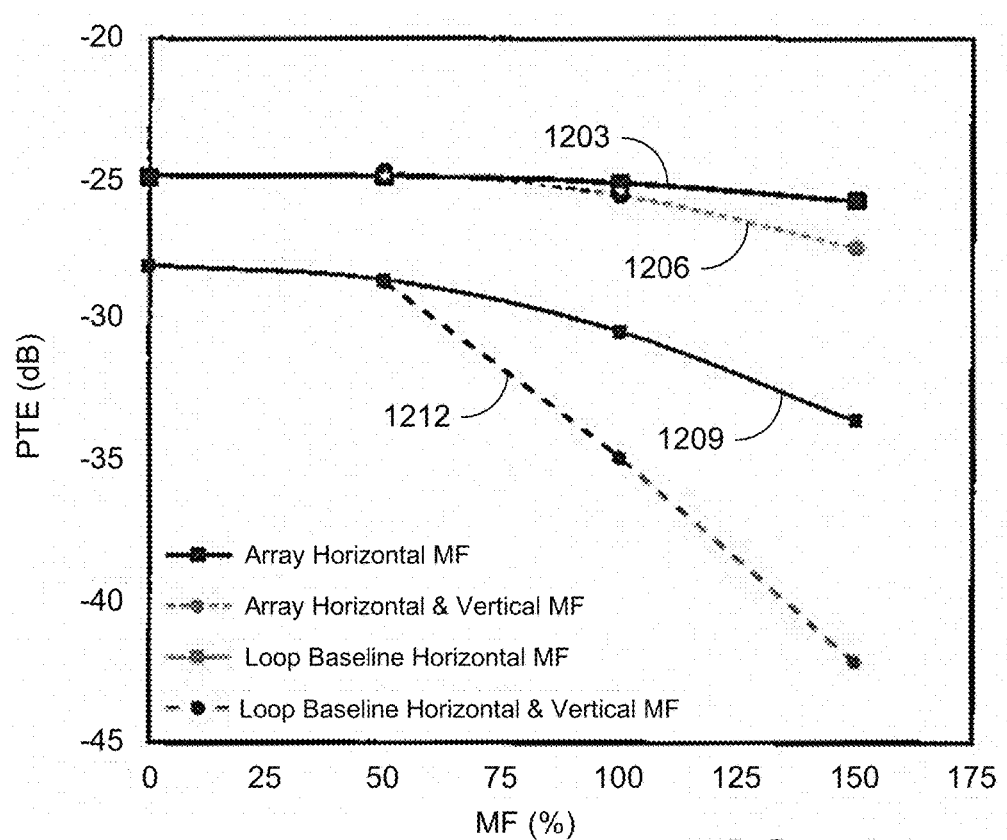
FIG. 12 is a plot illustrating measured PTE with respect to MF for a TX array topology and an equivalent loop, in accordance with various embodiments of the present disclosure.

Measured power transfer efficiency with optimum load conditions for the WPT system with the transmitter 1103, tissue equivalent phantom media, and chip-on-board 1106 with the RX coil 209 using the measurement setup of FIG. 11. FIG. 12 shows the measurement results of the PTE at a transmitter-receiver distance of 10 mm the different MFs. The solid curve 1203 shows the measured PTE of the transmitter array topology for only horizontal MF, the dashed curve 1206 shows the measured PTE of the transmitter array with equal horizontal and vertical MF, the solid curve 1209 shows PTE of the equivalent loop for only horizontal MF and the dashed curve 1212 shows PTE with equal horizontal and vertical MF as a comparison baseline. For the transmitter array topology, a maximum efficiency of −24.9 dB or 0.32% was achieved at 0% MF. For 50% horizontal and/or vertical MF, PTE remained virtual unchanged. At 150% MF in both horizontal and vertical directions, a worst case PTE of −27.4 dB or 0.18% was obtained. The variation in PTE was 2.52 dB between best and worst case alignments for the transmitter array topology. For the equivalent loop, a maximum efficiency of −28.1 dB or 0.16% was achieved at 0% MF. At 150% MF in both horizontal and vertical directions, a PTE of −42.1 dB or 0.006% was obtained. The variation in PTE was 14 dB between best and worst case alignments for the equivalent loop. The transmitter array offers a PTE improvement of 3.1 dB at 0% MF and 14.7 dB at 150% MF in both horizontal and vertical directions.

Referring now to FIG. 13, shown is a comparison of WPT systems to biomedical implants. Various WPT systems for shallow biomedical implants are shown in Table III of FIG. 13. Design choices of transmitter size, operation frequency, implant size, and implant technology differ across various implementations. Because it is desirable to minimize implant size while maintaining high power transfer efficiency, a figure of merit (FOM=$\eta$(%). $A_{TX}/A_{RX}$) has been introduced to quantify performance; where $\eta$ is the power transfer efficiency, $A_{TX}$ is the area of the external transmitter, and $A_{RX}$ is the area of the implanted receiver.

For a one-to-one WPT system, the transmitter and receiver coils have equal areas, which results in a high coupling coefficient when both are perfectly aligned. One-to-one implementations are not practical for small biomedical implants since perfect alignment to an external transmitter is not feasible. As a result, none of the reported implementations in Table III of FIG. 13 use this method. The $A_{TX}/A_{RX}$ term in the FOM therefore accounts for the misalignment tolerance.

For a best case scenario in which the receiver coil is aligned at the center of a transmitter coil, power transfer efficiency is maximized. However, misalignment data is not reported. In this disclosure, design for misalignment was implemented using a transmitter array structure (TX array 212) with an excitation element 603 and resonant elements 606 approximately equal in area to the RX coil 209. Performance of the WPT system is reported for various misalignment factors as shown in Table III of FIG. 13.

The external transmitter coils are typically implemented on PCB, while implantable receiver coils have been designed on PCB, as wire wound coils or micro-fabricated coils. PCB coils are cheapest to design and fabricate, but cannot be easily miniaturized to achieve a small implant size. Wire wound coils have the highest quality factor performance, and can be miniaturized using painstakingly wound turns. However, fabrication and integration costs are high. A micro-fabricated on-chip coil in 90-nm CMOS technology was used for this evaluation. On-chip coils have the lowest quality factor performance, but offer low integration cost and can easily be miniaturized. In spite of their low quality factor, careful design procedures can be used to optimize system performance.

A WPT platform with misalignment tolerance was implemented herein, with a basic single layer on-chip receiver coil designed with no co-optimization of transmitter and receiver coils. The measured quality factor of the basic on-chip receiver coil was less than 3 between 50 MHz and 160 MHz. In "Fully Integrated On-Chip Coil in 0.13 CMOS for Wireless Power Transfer through Biological Media" by M. Zargham et al. (IEEE Trans. Biomed. Circuits Syst., vol 9, no. 2, pp. 259-271, 2015), a dual layer on-chip coil was implemented and transmitter-receiver coils were co-designed for optimum power transfer efficiency. As a result, a receiver coil quality factor greater than 8 was obtained between 50 MHz and 160 MHz.

The operating frequency can vary across WPT system implementations. For example, "Design and Optimization of a 3-coil Inductive Link for Efficient Wireless Power Transmission" by M. Kiani et al. (IEEE Trans. Biomed Circuits Syst., vol. 5, no. 6. pp. 519-591, 2011) used the 13.56 MHz ISM band, "Resonant Inductive Link for Remote Powering of Pacemakers" by G. Monti et al. (IEEE Trans. Microw. Theory Techn., vol. 63, no 11, pp. 3814-3822, 2015) used 403 MHz MedRadio band, and "A mm-Sized Implantable Power Receiver with Adoptive Link Compensation" by S. O'Driscoll et al. (IEEE Solid-State Circuits Conf. Dig. Tech. Papers, pp. 294-295, 2009) used the 915 MHz ISM band. The design choice of operation frequency is a tradeoff between receiver technology, receiver size, and system performance. Operating at high frequencies appears attractive due to its potential to reduce implant coil size. A WPT system operating at 1600 MHz was been implemented in "Wireless Power Transfer to Deep-Tissue Micro-Implants" by J. S. Ho et al. (Proc. Natl. Acad. Sci. U.S.A. vol. 111, no. 22, pp. 7974-7979, 2014), resulting in a small receiver coil size of 3.14 mm². Operation at such high frequencies is possible due to high self-resonant frequencies of wire wound coils. However, at high frequencies significant absorption of electromagnetic energy occurs in the tissue media. The system operating at 1600 MHz has a very low efficiency of 0.04% as shown in Table III of FIG. 13. The system operating at 13.56 MHz exhibited the highest efficiency of 6.9% for a PCB receiver coil. However, its implant coil area of 78 mm² is large. For micro-fabricated CMOS coils disclosed herein and in "Fully Integrated On-Chip Coil in 0.13 CMOS for Wireless Power Transfer through Biological Media" by M. Zargham et al., the self-resonant frequency is low due to high turn-to-turn and layer-to-substrate parasitic capacitance. A self-resonant frequency of 235 MHz in this work sets an upper bound on the operation frequency. An operation frequency of 89 MHz was used for optimum power transfer efficiency between the TX array 212 and a 4 mm×4 mm receiver on-chip coil.

In summary, a maximum FOM of 68.8 was obtained in "Wireless Power Transfer to Deep-Tissue Micro-Implants" by Ho et al. However, its custom wire wound receiver uses expensive fabrication, integration, and packaging processes. In "Design and Optimization of a 3-coil Inductive Link for Efficient Wireless Power Transmission" by M. Kiani et al., "Resonant Inductive Link for Remote Powering of Pacemakers" by G. Monti et al., and "A mm-Sized Implantable Power Receiver with Adoptive Link Compensation" by S.

O'Driscoll et al., the receiver coils were fabricated on a PCB which tended to be large and increase implant size. "Fully Integrated On-Chip Coil in 0.13 CMOS for Wireless Power Transfer through Biological Media" by M. Zargham et al. implemented a microfabricated coil and reports the second highest FOM due to its dual layer receiver and co-design of transmitter-receiver coils. However, none of these WPT systems account for misalignment tolerance. In this disclosure, design for misalignment tolerance was incorporated on the transmitter side. However, the fabricated on-chip receiver was not optimized for maximum quality factor. A significant improvement in quality factor is possible using multi-layers with optimized track width, spacing, and number of turns. The disclosed design procedure can optimize power transfer efficiency for a WPT system with an arbitrary non-optimal receiver.

A novel transmitter array topology has been presented for WPT to a misaligned transmitter-receiver system. Tissue equivalent phantoms comprising skin and fat layers were developed to demonstrate wireless power transmission to shallow biomedical implants. A scanning algorithm to compute an optimum load impedance was disclosed for a transmitter array topology, in order to simplify design of a WPT system with multiple elements. Performance of the WPT system was demonstrated using a 4 mm×4 mm micro-fabricated implantable receiver coil in 90-nm CMOS technology and an external PCB transmitter array coil.

A FOM based on the implant size, power transfer efficiency, and degree of misalignment was introduced to evaluate the system performance. Despite using a non-optimal micro-fabricated receiver coil with a low quality factor, a maximum FOM of 17 was reported as shown in Table III of FIG. 13. At 150% MF in both horizontal and vertical directions, the FOM was 9.6 which exceeds the performance of a perfectly aligned WPT system reported in "Resonant Inductive Link for Remote Powering of Pacemakers" by G. Monti et al. and "A mm-Sized Implantable Power Receiver with Adoptive Link Compensation" by S. O'Driscoll et al. The design methodology and techniques in this disclosure can be applied to tackle misalignment problems often encountered in WPT systems.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method for wireless power transfer, comprising:
 positioning a transmitter (TX) array adjacent to a receiver (RX) coil of a device, the TX array comprising an excitation coil excited by a radio frequency (RF) power source and a layer of passive, non-overlapping resonant coils distributed about and surrounding the excitation coil, where each resonant coil of the layer of passive, non-overlapping resonant coils is adjacent to the excitation coil and two other resonant coils of the layer of passive, non-overlapping resonant coils; and
 transferring power from the RF power source to the RX coil by coupling a magnetic field originating from the excitation coil throughout the TX array thereby allowing coupling with the RX coil when overlapping at least a portion of the layer of passive, non-overlapping resonant coils without overlapping the excitation coil.

2. The method of claim 1, wherein the RX coil is an on-chip RX coil.

3. The method of claim 1, wherein the RX coil is approximately equal in size to one resonant coil of the layer of passive, non-overlapping resonant coils.

4. The method of claim 3, wherein the TX array transfers power to the RX coil with a misalignment factor (MF) of up to 150%, where the MF is a lateral separation of a center of the RX coil from a center of the excitation coil normalized to a size of the one resonant coil.

5. The method of claim 1, wherein an area of the excitation coil is approximately 4 times an area of each resonant coil of the layer of passive, non-overlapping resonant coils.

6. The method of claim 1, wherein the excitation coil and individual resonant coils of the plurality of resonant coils have a substantially square shape.

7. The method of claim 1, wherein the layer of passive, non-overlapping resonant coils is a first layer of passive, non-overlapping resonant coils and the TX array comprises a second layer of passive, non-overlapping resonant coils located outside the first layer of passive, non-overlapping resonant coils opposite the excitation coil, wherein coupling the magnetic field throughout the TX array allows power transfer to the RX coil when it extends beyond the second layer of passive, non-overlapping resonant coils without overlapping the first layer of passive, non-overlapping resonant coils.

8. The method of claim 7, wherein individual resonant coils of the first layer and the second layer are a uniform size.

9. The method of claim 8, wherein an area of the excitation coil is approximately 4 times an area of each resonant coil of the layer of passive, non-overlapping resonant coils.

10. The method of claim 7, wherein individual resonant coils of the first layer or the second layer are separated from adjacent resonant coils in that layer by a uniform distance.

11. The method of claim 1, wherein the device is a biomedical implant inserted below a skin surface of a subject.

12. The method of claim 11, comprising positioning the TX array on the skin surface adjacent to the RX coil to transfer the power.

13. The method of claim 12, comprising affixing the TX array to the skin surface.

14. The method of claim 1, wherein the excitation coil and the layer of passive, non-overlapping resonant coils are formed on a printed circuit board (PCB).

15. The method of claim 14, wherein the excitation coil and the layer of passive, non-overlapping resonant coils are multi-turn coils disposed on both sides of the PCB.

16. The method of claim 15, wherein the excitation coil and the plurality of passive, non-overlapping resonant coils comprise two spirally-wound turns on each side of the PCB.

17. The method of claim 14, wherein the PCB is flexible.

18. The method of claim 1, wherein the TX array is formed on a flexible substrate.

19. The method of claim 1, wherein the TX array comprises a plurality of concentric layers of passive, non-overlapping resonant coils surrounding the excitation coil.

20. The method of claim 1, wherein the RF power source excites the excitation coil via an RF power amplifier.

\* \* \* \* \*